(12) United States Patent
Burgess

(10) Patent No.: US 8,172,181 B2
(45) Date of Patent: May 8, 2012

(54) FUEL RANGE FOR AN AIRCRAFT

(76) Inventor: Calvin Burgess, Guthrie, OK (US)

( * ) Notice: Subject to any disclaimer, the term of this patent is extended or adjusted under 35 U.S.C. 154(b) by 859 days.

(21) Appl. No.: 11/644,854

(22) Filed: Dec. 22, 2006

(65) Prior Publication Data

US 2008/0149767 A1   Jun. 26, 2008

(51) Int. Cl.
*B64D 37/02* (2006.01)
(52) U.S. Cl. ............... 244/135 B; 244/135 R; 244/130; 244/119
(58) Field of Classification Search .................. 244/130, 244/135 R, 135 B, 117 R, 119, 135 C
See application file for complete search history.

(56) References Cited

U.S. PATENT DOCUMENTS

| | | | | |
|---|---|---|---|---|
| 2,038,998 A | * | 4/1936 | Hammond, Jr. | 244/135 R |
| 2,623,721 A | * | 12/1952 | Harrington | 244/135 R |
| 2,777,656 A | * | 1/1957 | Clifton | 244/135 B |
| 3,822,807 A | * | 7/1974 | MacDonald et al. | 220/88.1 |
| 4,026,503 A | * | 5/1977 | Rhodes | 244/135 B |
| 4,095,761 A | * | 6/1978 | Anderson et al. | 244/135 A |
| 5,845,879 A | * | 12/1998 | Jensen | 244/135 R |
| 5,975,466 A | * | 11/1999 | Kahara et al. | 244/135 R |
| 5,992,797 A | | 11/1999 | Seidel et al. | |
| 6,224,012 B1 | * | 5/2001 | Wooley | 244/2 |
| 6,398,158 B1 | | 6/2002 | Reeves | |
| 6,527,221 B1 | | 3/2003 | Kremeyer | |
| 6,986,484 B2 | | 1/2006 | Scott | |
| 7,063,288 B1 | | 6/2006 | Kremeyer | |
| 7,070,146 B2 | | 7/2006 | Morgenstern et al. | |
| 2005/0230554 A1 | * | 10/2005 | Schoene | 244/135 R |
| 2006/0006287 A1 | * | 1/2006 | Ferguson et al. | 244/130 |

* cited by examiner

*Primary Examiner* — Tien Dinh
*Assistant Examiner* — Philip J Bonzell
(74) *Attorney, Agent, or Firm* — Daniel P. Dooley; Hall Estill

(57) ABSTRACT

An apparatus and method for improving the fuel range of an aircraft are provided. The aircraft includes a fuselage with a front windshield, and an external skin providing a top cover for a cockpit of the aircraft. The apparatus includes an aerodynamic fairing secured adjacent the windshield and enclosing the external skin covering the cockpit for a reduction in an abrupt change in area encountered by air flowing along the length of the fuselage. An enclosure is formed between the aerodynamic fairing and the external skin in which a fuel bladder, configured with a reticulated polyurethane foam insert, may be disposed for added fuel capacity of the aircraft. The method includes steps of providing an aerodynamic fairing configured to balance the flow of fluid over the aircraft during flight, and securing the aerodynamic fairing atop the aircraft and adjacent the front windshield.

5 Claims, 4 Drawing Sheets

FUEL RANGE FOR AN AIRCRAFT

FIELD THE INVENTION

The claimed invention relates generally to the field of aviation and more particularly, but not by way of limitation, to a method and apparatus for improved fuel capacity for an aircraft to increase range.

BACKGROUND

The optimization of fluid flow over an aircraft is an important task typically undertaken by aeronautical engineers during the development and testing phases involved in bringing an aircraft to market. Balancing the air flow over the aircraft reduces drag encountered by aircraft during flight, which reduces fuel consumption of the aircraft across a range of flight speeds of the aircraft, thereby increasing the range of the aircraft for a specific fuel capacity. A reduction in drag encountered by the aircraft during flight also permits attainment of greater in flight speeds of the aircraft. In either case, the ratio of fuel consumption to airspeed decreases with the reduction of drag.

Most commercial and private aircraft in service today were developed during times of "cheap" fuel, when the focus of development teams were predominantly devoted to the maximization of passenger payload the aircraft could carry, and the ease of manufacturing the airframe. Recently, aircraft engine development teams have been developing higher efficiency, cleaner burning engines, which improve the overall energy efficiency of aircraft, and airframe development teams have been working on reducing drag encountered by the wings. However, a source of drag that remains for the vast majority of in-service transonic, i.e., flight speed greater than Mach 0.7 aircraft is drag encountered by the aircraft during flight as a result of air flowing over the front windshield, and abruptly encountering the main body portion of the fuselage.

Accordingly, there is a long felt need for methods and apparatus for reducing the effects of windshield induced drag, and improving the fuel range for an aircraft operating within the operating limits prescribed for the aircraft.

SUMMARY OF THE INVENTION

In accordance with a preferred embodiment, an aircraft includes at least a fuselage providing a front windshield, and an external skin adjacent the windshield, wherein the external skin covers a top portion of a cockpit of the aircraft, and an aerodynamic fairing secured adjacent the windshield and enclosing the external skin covering the cockpit to form an enclosed volume.

In accordance with a preferred embodiment, the aerodynamic fairing is configured to balance the flow of air flowing across the aircraft during flight by improving the distribution of the area along the fuselage axis, which reduces drag encountered by the aircraft during flight. The fuselage preferably further providing a condensate relief channel disposed between the aerodynamic fairing and the external skin covering the cockpit. The condensate relief channel provides a channel for relief of any condensate formed within the enclosed volume, and the aerodynamic faring is preferably formed from materials such as aluminum, carbon fiber composite, fiberglass composite, and metal matrix composites.

In an alternate preferred embodiment, the space created between the aerodynamic faring and the external skin covering the cockpit, i.e., the enclosed volume, is used for the inclusion of a fuel bladder, which is disposed between the aerodynamic fairing and the external skin covering the cockpit. The fuel bladder provides additional fuel carrying capacity for the aircraft, which extends the flight range for the aircraft.

To gain access to the fuel bladder, a fuel port supported by the aerodynamic fairing is included, and is fitted to provide access to the interior portion of the fuel bladder, for filling the bladder with fuel. The fuel port further mitigates escapement of the fuel from the bladder. Preferably, the fuel bladder is configured with a reticulated polyurethane foam insert enveloped by the fuel bladder. The reticulated polyurethane foam insert is included for fire/explosion suppression of the fuel.

In an alternative preferred embodiment, a method of improving fuel range preferably includes, providing an aerodynamic fairing configured to balance the flow of air over an aircraft during flight, thereby reducing drag encountered by said aircraft during flight; and securing the aerodynamic fairing atop the aircraft and adjacent a front windshield of the aircraft. In a preferred embodiment, the aerodynamic fairing in cooperation with an external skin covering the cockpit of the aircraft forms the enclosed volume. Due to changes in altitude encountered by the aircraft during flight, condensate frequently forms within the enclosed volume created between the aerodynamic faring and the external skin. Accordingly, the method of improving fuel range preferably further includes, forming a condensate relief channel disposed between the aerodynamic fairing and the external skin for relief of condensate formed between said aerodynamic fairing and said external skin.

In a preferred embodiment, the volume created between the aerodynamic faring and the external skin is utilized for the inclusion of additional fuel, therefore, the method preferably further includes, incorporating a fuel port in a top portion of the aerodynamic fairing, mounting a fuel bladder within the enclosed volume and fitting the fuel port to an interior portion of the fuel bladder, such that the fuel port provides access to the fuel bladder for supply of a fuel, while mitigating escapement of the fuel from the fuel bladder. The preferred embodiment further includes a step of disposing a reticulated polyurethane foam insert within the fuel bladder; the reticulated polyurethane foam insert is included for purposes of fire/explosion suppression of the fuel.

These and various other features and advantages, which characterize preferred embodiments of the present invention, will be apparent from reading the following detailed description in conjunction with reviewing the associated drawings.

DETAILED DESCRIPTION

Reference will now be made in detail to one or more examples of the invention depicted in the accompanying figures. Each example is provided by way of explanation of the invention, and is not meant as, nor do they represent, limitations imposed upon the invention. For example, features illustrated or described as part of one embodiment may be used with another embodiment to yield still a different embodiment. Other modifications and variations to the described embodiments are also contemplated and lie within the scope and spirit of the invention.

Figure 1:
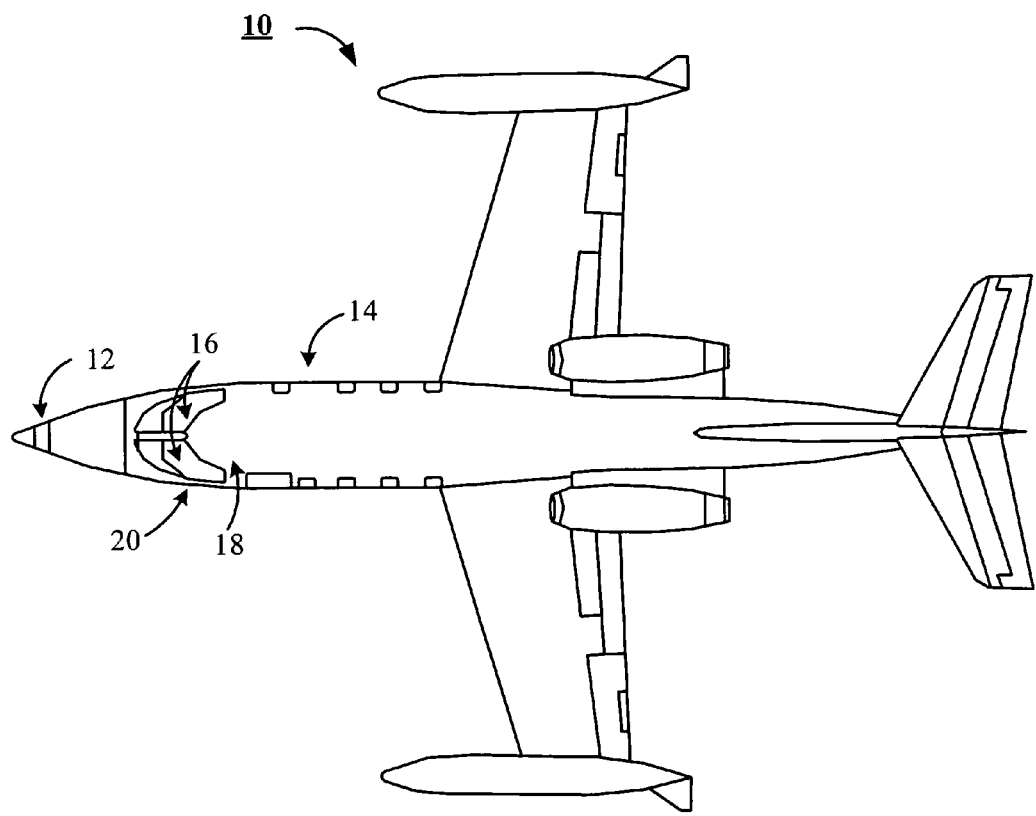
FIG. 1 is a top plan view of prior art aircraft found useful in applying the present invention.
Figure 2:
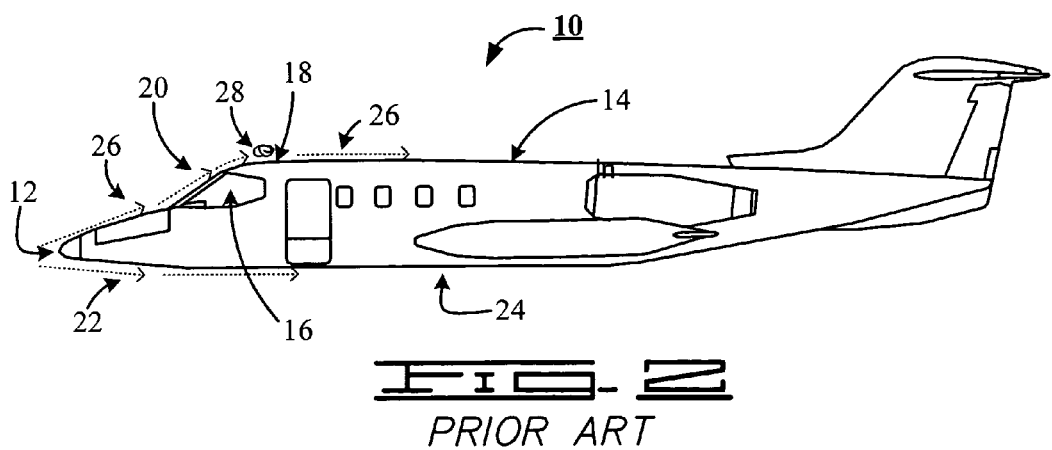
FIG. 2 provides an in flight side elevation view of the prior art aircraft of FIG. 1.
Figure 3:
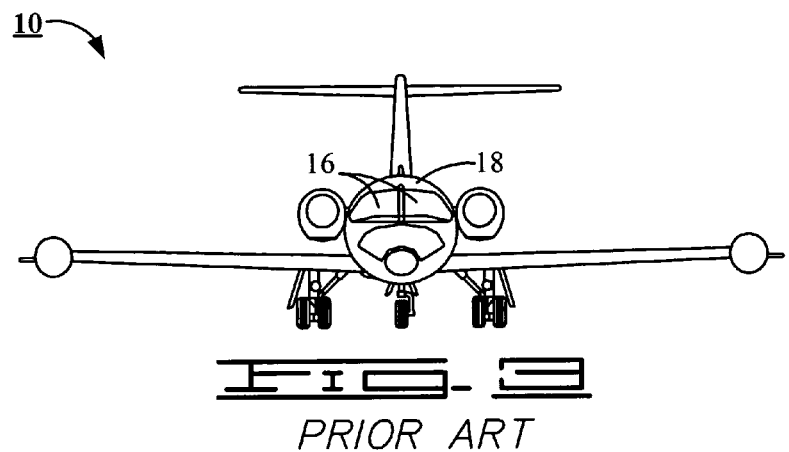
FIG. 3 provides a front elevation view of the prior art aircraft of FIG. 1.

Referring to the drawings, to provide an enhanced understanding of the present invention, a reader is encouraged to view prior art FIGS. 1, 2, and 3 in concert while proceeding with reading this description of the present invention. Collectively, prior art FIGS. 1, 2, and 3 depict aircraft applicable for use in forming the present invention.

Prior art FIG. 1 presents a plan view a prior art aircraft 10 found useful in practicing the present invention. Prior art FIG. 2 shows the prior art aircraft 10 in an in flight elevation view, and FIG. 3 shows a front view of prior art aircraft 10. When collectively viewing prior art FIGS. 1, 2, and 3, the reader's attention is drawn to the location of a nose portion 12 of a fuselage 14, a front windshield 16, and a portion of the fuselage skin 18 adjacent the windshield 16 and covering a cockpit 20 of the prior art aircraft 10.

The prior art aircraft 10, of FIG. 2, depicts an air flow path 22 (shown by dashed lines) taken by air passing across an underside 24 of the prior art aircraft 10 during flight, and an air flow path 26 (shown by dashed lines) taken by air passing across a top of the nose portion 12, the front windshield 16, and the fuselage skin 18 covering the cockpit 20, i.e., the path taken by air passing across the top side of the prior art aircraft 10.

As those skilled in the art will recognize, as the air flows encounters the nose and windshield 16 and flows over the length of the fuselage the air flow encounters an abrupt change in area. This abrupt change in area imparts additional drag on the prior art aircraft 10, which equates to a higher burn rate of fuel during flight of the prior art aircraft 10. This increased drag generally in the region indicated by sign number 28 located substantially above the cockpit 20.

Figure 4:
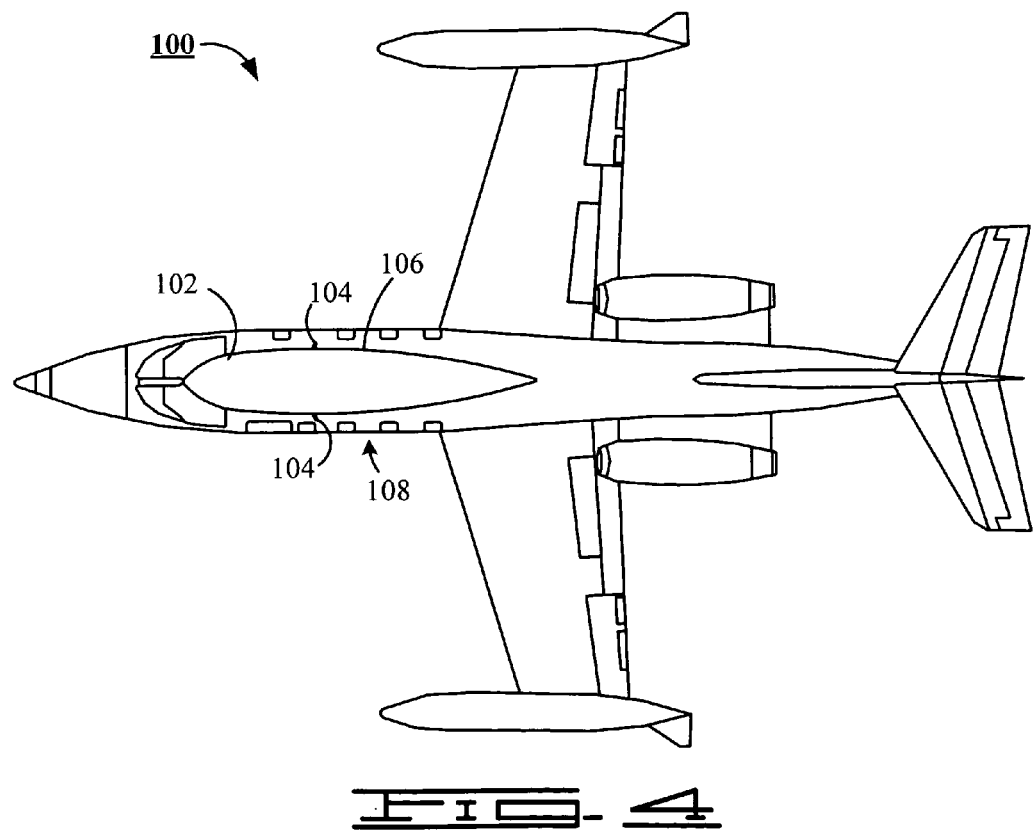
FIG. 4 is a top plan view of an aircraft of the present invention.

FIG. 4 shows a top plan view of an inventive aircraft 100 depicting an aerodynamic fairing 102, and a pair of condensate relief channels 104. It will be noted that the aerodynamic faring 102 has a "teardrop" shape and contour, and that the pair of condensate relief channels 104 are located at the lowest point of interaction between the aerodynamic fairing 102 and a skin 106 of fuselage 108.

Figure 5:
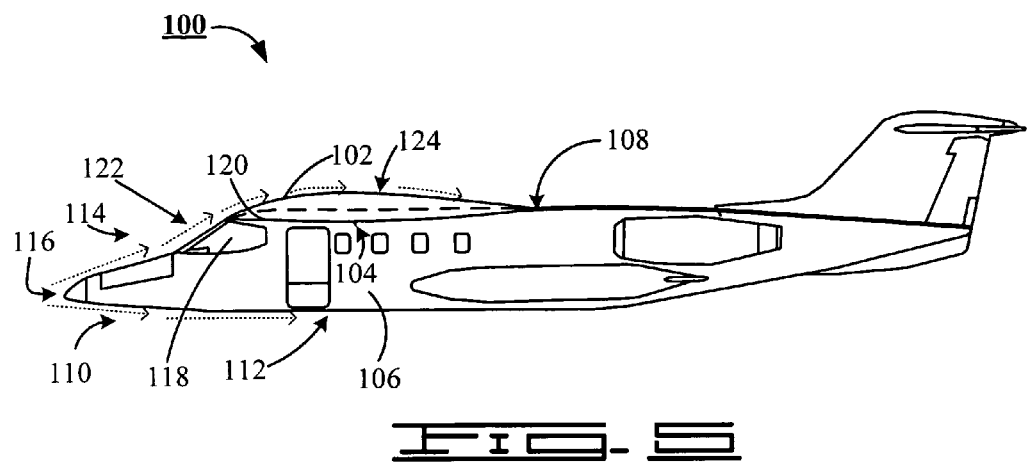
FIG. 5 provides an in flight side elevation view of the aircraft of FIG. 4.

The present inventive aircraft 100, of FIG. 5, depicts an air flow path 110 (shown by dashed lines) taken by air passing across the underside 112 of the present inventive aircraft 100 during flight, and an air flow path 114 (shown by dashed lines) taken by air passing across a top portion of a nose portion 116, a front windshield 118, and the aerodynamic fairing 102, i.e., the path taken by air passing across the top side of the present inventive aircraft 100. It will be noted that in a preferred embodiment, the aerodynamic fairing 102 covers an external skin portion 120 of the skin 106 that envelopes the fuselage 108. In particular, the external skin portion 120 covers a top of a cockpit 122 of the present inventive aircraft 100, which is enclosed by the external skin portion 120.

As those skilled in the art will recognize, as the air flow encounters and subsequently flows over the windshield 118, the air flow encounters an abrupt change in area along the length of the fuselage. The inclusion of the aerodynamic fairing 102 reduces the abruptness and therefore reduces the amount of drag encountered by the inventive aircraft 100.

The mitigation of the abruptness encountered by the air flow passing over the length of the fuselage of the present inventive aircraft 100 during flight, results in an attainment of a reduced rate of fuel burn at any given speed at which the present inventive aircraft 100 is traveling, thereby improving the fuel range for the present inventive aircraft 100. Those skilled in the art will also recognize that a reduction in drag encountered by the present inventive aircraft 100 during flight, also equates to an ability of the present inventive aircraft 100 to attain higher rates of speed during flight.

Figure 6:
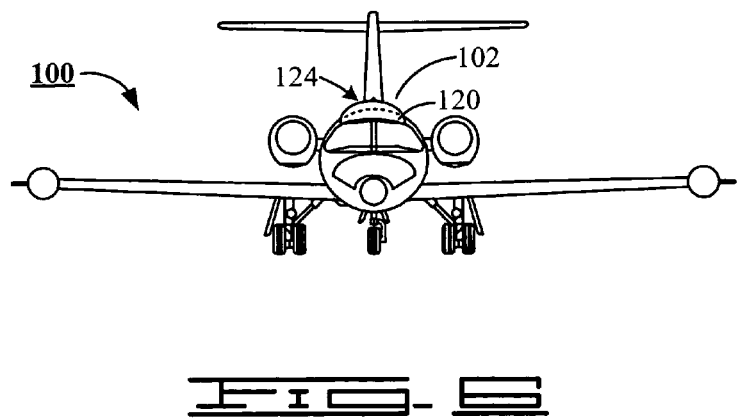
FIG. 6 provides a front elevation view of the aircraft of FIG. 4.

FIG. 5 further shows that the aerodynamic faring 102 provides somewhat of a continuum of the slope of the windshield 118, which then crests and provides a smooth roll off transition back to the skin 106 that envelopes the fuselage 108, while FIG. 6 shows the face of the aerodynamic fairing 102 to have a smooth, rounded, almost bullet like contour; a shape known to those skilled in the art for its ability to minimize an abrupt change in area encountered by the air stream. Also shown by FIG. 5 is an enclosed volume 124, which is formed between the aerodynamic fairing 102 and the external skin portion 120 when the aerodynamic fairing 102 is attached adjacent the windshield 118 and to the external skin portion 120 of the fuselage 108.

In a preferred embodiment, the condensate relief channels 104 provide a channel for relief of condensate formed within the enclosed volume 124 via changes in altitude encountered by the present inventive aircraft 100 during normal flight operations. Additionally, the aerodynamic fairing 102 is preferably formed from materials such as aluminum, a carbon fiber composite, a fiberglass composite, and metal matrix composites. FIG. 5 additionally shows that in a preferred embodiment, the windshield 118 is configured such that at least a portion of the windshield 118 extends beneath the fairing 102, and in which the external skin portion 120 covering the cockpit blocks at least a portion of a field of view above the head of a pilot flying the aircraft.

Figure 7:
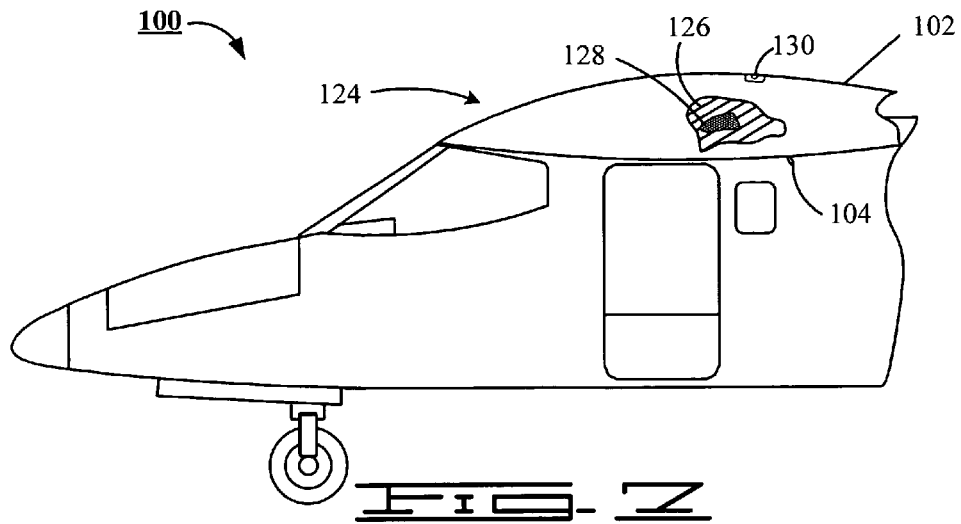
FIG. 7 shows a partial cut-away, side elevation view of the aircraft of FIG. 4, showing an aerodynamic fairing in partial cut-away.

FIG. 7 depicts an alternate preferred embodiment of the present inventive aircraft 100. In the alternate preferred embodiment, the enclosed volume 124 (of FIG. 5) is fitted with a fuel bladder 126 (shown in partial cut-away), which provides a reticulated polyurethane foam insert 128 (also shown in partial cut-away), enveloped by the fuel bladder 126. The reticulated polyurethane foam insert 128 is included as an explosion suppression for fuel contained within the fuel bladder 126. FIG. 7 further shows a fuel port 130 is supported by the aerodynamic fairing 102. The fuel port 130 is fitted to the fuel bladder such that an interior of the fuel bladder 126 is made accessible for the supply of fuel to the fuel bladder 126. That is, the fuel port 130 provides access to the fuel bladder 126, and mitigates escapement of fuel from said fuel bladder 126.

Figure 8:
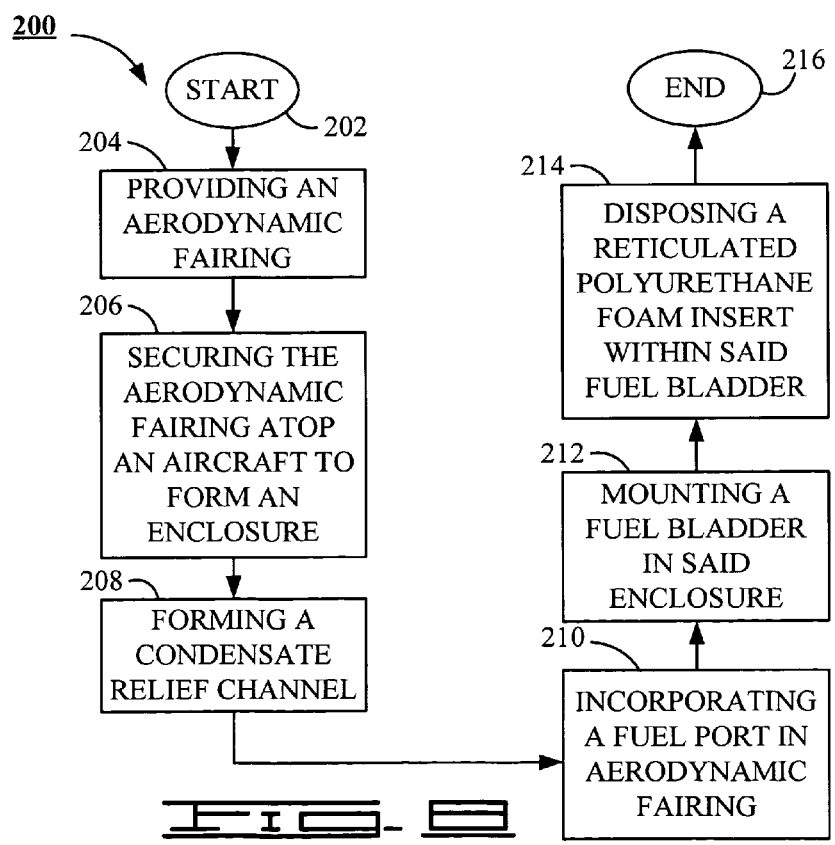
FIG. 8 is a diagram of a flowchart of a method of making the present invention.

Turning to FIG. 8, the flow chart 200 depicts a process of forming an inventive aircraft (such as 100). It will be understood that the steps of the process described herein below need not be performed in the order presented, and that the sequence of the process steps as presented herein below does not impose any limitations on the present invention.

Accordingly, the method commences at start process step 202, and proceeds to process step 204, with the provision of an aerodynamic fairing (such as 102). At process step 206, the aerodynamic fairing is secured atop the inventive aircraft to form an enclosed volume (such as 124). The aerodynamic fairing is secured adjacent a front windshield (such as 118), and above an external skin portion (such as 120) covering a cockpit (such as 122) of the inventive aircraft.

At process step 208, a condensate relief channel (such as 104) is formed between the aerodynamic fairing and the external skin. At process step 210, a fuel port (such as 130) is incorporated within the aerodynamic fairing, and at process step 212, a fuel bladder (such as 126) is mounted within the enclosed volume, and an interior of the fuel bladder is fitted to the fuel port, such that fuel port provides access to the fuel bladder for supply of a fuel, and mitigates escapement of the fuel from said fuel bladder.

At process step 214, a reticulated polyurethane foam insert (such as 128) is disposed within the fuel bladder, and the process concludes at end process step 216.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for a select engine, while maintaining the same functionality without departing from the spirit and scope of the invention.

What is claimed is:

1. A method of improving fuel range of an aircraft having a wing, by steps comprising:

providing an aerodynamic fairing configured to reduce an abrupt change in area encountered a flow of fluid over a length of a fuselage of the aircraft during flight, thereby reducing drag encountered by said aircraft during flight; and securing said aerodynamic fairing atop said aircraft and adjacent a front windshield, wherein said aerodynamic fairing in cooperation with an external skin covering a cockpit of said aircraft form an enclosed volume there between, wherein said aerodynamic fairing forms no portion of said wing, and further wherein at least a portion of the front windshield extends beneath the fairing, and in which the external skin covering the cockpit blocks at least a portion of a field of view above the head of a pilot flying the aircraft.

2. The method of claim 1, by a step further comprising, forming a condensate relief channel disposed between said aerodynamic fairing and said external skin for relief of condensate formed between said aerodynamic fairing and said external skin.

3. The method of claim 2, by a step further comprising, incorporating a fuel port in a top portion of said aerodynamic fairing.

4. The method of claim 3, by a step further comprising, mounting a fuel bladder within said enclosed volume, wherein an interior of the fuel bladder is fitted to said fuel port such that said fuel port provides access to the fuel bladder for supply of a fuel and mitigates escapement of the fuel from said fuel bladder.

5. The method of claim 4, by a step further comprising, disposing a reticulated polyurethane foam insert within said fuel bladder, said reticulated polyurethane foam insert for explosion suppression of said fuel.

* * * * *